US010616262B2

(12) United States Patent
Perez Lafuente et al.

(10) Patent No.: US 10,616,262 B2
(45) Date of Patent: Apr. 7, 2020

(54) AUTOMATED AND PERSONALIZED PROTECTION SYSTEM FOR MOBILE APPLICATIONS

(71) Applicants: Bankinter S.A., Madrid (ES); Seglan S.L., Madrid (ES)

(72) Inventors: Carlos Alberto Perez Lafuente, Madrid (ES); Julio San Jose Sanchez, Madrid (ES); Imanol Garcia Murga, Madrid (ES)

(73) Assignees: BANKINTER, S.A., Madrid (ES); SEGLAN, S.L., Madrid (ES)

( * ) Notice: Subject to any disclaimer, the term of this patent is extended or adjusted under 35 U.S.C. 154(b) by 465 days.

(21) Appl. No.: 15/125,610

(22) PCT Filed: Mar. 3, 2015

(86) PCT No.: PCT/EP2015/054428
§ 371 (c)(1),
(2) Date: Sep. 13, 2016

(87) PCT Pub. No.: WO2015/139950
PCT Pub. Date: Sep. 24, 2015

(65) Prior Publication Data
US 2017/0006057 A1 Jan. 5, 2017

(30) Foreign Application Priority Data

Mar. 17, 2014 (ES) .................................. 201400211

(51) Int. Cl.
*H04L 29/06* (2006.01)
*H04W 4/50* (2018.01)
(Continued)

(52) U.S. Cl.
CPC .......... *H04L 63/1441* (2013.01); *G06F 21/14* (2013.01); *G06F 21/54* (2013.01);
(Continued)

(58) Field of Classification Search
CPC ..... H04L 67/34; H04L 63/1441; H04L 63/20; H04L 2209/16; H04L 41/0896;
(Continued)

(56) References Cited

U.S. PATENT DOCUMENTS 8,756,271 B2 * 6/2014 Rehtijarvi ............... H04L 67/34
709/203
8,868,455 B2 * 10/2014 Raleigh .............. G06Q 30/0601
705/34

(Continued)

FOREIGN PATENT DOCUMENTS

WO  WO 2008/034900   *  3/2008  ............. G06F 21/12

*Primary Examiner* — Ali S Abyaneh
*Assistant Examiner* — Shu Chun Gao
(74) *Attorney, Agent, or Firm* — Edell, Shapiro & Finnan, LLC (57) ABSTRACT

This invention relates to a method and a system to automatically generate mobile device software applications, where each one is differently personalized in terms of security parameters and/or obfuscation rules, by using a set of input registries from a first entity, each input registry containing at least a unique identifier and is used to generate an output personalization registry, that is different than another output registry. A second entity uses at least part of the data of the output registry, a generic replica of the mobile device software application and obfuscation software to generate a protected mobile software application that is associated to the output registry and to the at least one unique identifier. A user requests a replica of the mobile software application to the first entity and a protected mobile software application is downloaded to a user mobile device.

26 Claims, 3 Drawing Sheets

(51) Int. Cl.
*H04L 29/08* (2006.01)
*G06F 21/14* (2013.01)
*G06F 21/54* (2013.01)
*H04W 12/00* (2009.01)
*H04W 12/02* (2009.01)

(52) U.S. Cl.
CPC ............. *H04L 63/20* (2013.01); *H04L 67/34* (2013.01); *H04W 4/50* (2018.02); *H04W 12/0027* (2019.01); *H04L 2209/16* (2013.01); *H04W 12/02* (2013.01)

(58) Field of Classification Search
CPC .. H04L 43/50; G06Q 30/016; G06Q 30/0611; G06Q 30/06; H04W 12/02; H04W 4/001; G06F 21/14; G06F 21/54
See application file for complete search history.

(56) References Cited

U.S. PATENT DOCUMENTS

| | | | | |
|---|---|---|---|---|
| 9,134,969 B2* | 9/2015 | Brandstetter | ............. | G06F 8/34 |
| 9,189,207 B2* | 11/2015 | Torgemane | ............... | G06F 8/30 |
| 9,361,636 B2* | 6/2016 | Mohammed | ......... | G06Q 30/016 |
| 9,554,754 B2* | 1/2017 | Ruby | .................... | A61B 5/7264 |
| 9,558,512 B2* | 1/2017 | Rehtijarvi | ............. | H04L 67/303 |
| 10,211,991 B1* | 2/2019 | Aplemakh | ............. | H04L 47/824 |
| 2001/0047363 A1* | 11/2001 | Peng | .................... | G06F 12/121 |
| 2005/0138392 A1* | 6/2005 | Johnson | .................. | G06F 21/14 |
| | | | | 713/186 |
| 2005/0187873 A1* | 8/2005 | Labrou | .................. | G06Q 20/02 |
| | | | | 705/40 |
| 2006/0020883 A1* | 1/2006 | Kothari | ................. | H04L 67/306 |
| | | | | 715/234 |
| 2008/0059605 A1* | 3/2008 | Shalev | ............... | H04L 12/2814 |
| | | | | 709/217 |
| 2009/0292929 A1* | 11/2009 | Henry | ..................... | G06F 21/72 |
| | | | | 713/189 |
| 2010/0211638 A1* | 8/2010 | Rougier | .................... | G06F 8/30 |
| | | | | 709/205 |
| 2010/0325202 A1* | 12/2010 | Rehtijarvi | ............... | H04L 67/34 |
| | | | | 709/203 |
| 2013/0024497 A1* | 1/2013 | Elloumi | ............. | H04L 63/0428 |
| | | | | 709/203 |
| 2013/0191810 A1* | 7/2013 | Brandstetter | ............. | G06F 8/34 |
| | | | | 717/109 |
| 2013/0254845 A1* | 9/2013 | Boesgaard Soerensen ................ G06F 21/55 |
| | | | | 726/3 |
| 2013/0283262 A1* | 10/2013 | Rehtijarvi | ................ | G06F 8/60 |
| | | | | 717/178 |
| 2014/0173550 A1* | 6/2014 | Miles | ........................ | G06F 8/20 |
| | | | | 717/104 |
| 2014/0325544 A1* | 10/2014 | Oh | ....................... | H04N 21/435 |
| | | | | 725/14 |
| 2016/0269509 A1* | 9/2016 | Dooley | ................. | G06F 9/4411 |

* cited by examiner

AUTOMATED AND PERSONALIZED PROTECTION SYSTEM FOR MOBILE APPLICATIONS

OBJECT OF THE INVENTION

This invention relates to a method to automatically personalize, in terms of security, mobile device software applications. This invention also relates to a system, a server and a mobile device suitable for carrying out such a method.

BACKGROUND ART

Microprocessor smart cards have been commonly used to protect keys and secret data of given applications from service providers. Being considered as a "tamper resistant" device, the smart cards have been used to protect payment applications from banks, ticketing applications from transportation authorities or biometric data for access control purposes.

Mobile contactless technologies offer a tremendous opportunity to deploy service provider's applications and services via a new form factor token, and secure elements such as SIM cards, micro-SD cards or mobile phone embedded chips has been looked during quite a long time as the right place to securely store the most sensitive part of mobile applications of the service providers.

In spite of the huge potential of the secure elements in terms of secure storage capabilities, several barriers—mostly related to business models and ecosystems complexity—have limited their possibilities to exploit in areas such as mobile contactless payments.

To occupy such space new emerging technologies are coming up, some of them relaying on a new security paradigms, different than traditional secure storage. In current state of the art technology it is possible to "emulate" a smart card by software and to use it in the context of contactless transactions, using the so called "Host Card Emulation" (HCE) technology, currently supported in Blackberry and Android devices; so it is possible to perform NFC payments by using such a software smart card emulation into an smartphone.

Technology exists today to protect the mobile device software applications for payments, transportation, access control, couponing, mobile banking, mobile trading/brokerage, etc., using a combination of techniques for logical security protection.

It is presumed that attacks to gain access to e.g. secret data into software mobile device applications will become more severe in the next coming future, as far the incentive for an attacker to profit from the stored data is currently becoming higher. So it is expected that mobile device software applications, and in particular mobile contactless software applications, will require to gradually incorporate the above referred security protection technologies.

Main weakness of current technologies to protect mobile software applications relates to the fact that they provide the same protection for all replicas (e.g. one per user and per mobile device) of an executable protected application to be delivered to end users, so an attacker may still have the incentive to crack one to then, using the same logic, crack many.

It can therefore be of interest for service providers to have available mechanisms for deploying a different security personalization for each user utilizing a given mobile software application.

DISCLOSURE OF THE INVENTION

So a first aspect of the invention is to provide a new automated and personalized protection method for mobile software applications, such a method requiring different entities to interact to secure and consistently deliver to each user of a given mobile device software application (and typically for each one of his devices) a different "tamper resistant" solution in terms of logical security, this system drastically decreasing to incentive for an attacker to try to get secret data from even one single user mobile device.

This object is achieved through a method to automatically generate mobile device software applications, where each one is differently personalized in terms of security parameters and/or obfuscation rules, said method comprising the following steps:

a) A first entity, being a service provider, generates a set of input registries, each input registry containing at least a unique identifier.

b) A second entity, being a security personalizer of mobile device software applications, receives the set of input registries and uses the at least one unique identifier included in an input registry to generate an output personalization registry, where this output registry is different than another output registry, generated from another input registry, in terms of security parameters and/or obfuscation rules for personalization.

c) The second entity uses at least part of the data of the output registry, a generic replica of the mobile device software application and obfuscation software to generate a protected mobile software application that is associated to the output registry and to the at least one unique identifier, being this protected mobile software application different in terms of security parameters and/or obfuscation rules than another one obtained using at least part of another output registry.

d) The second entity sends the protected mobile software applications to the first entity, each one associated to one or several unique identifiers from the corresponding input registry, and the first entity stores them and the association to at least one of the unique identifiers.

e) A user requests a replica of the mobile software application to the first entity and a protected mobile software application is downloaded to a user mobile device.

While most of the embodiments into de description of this invention refer to the set of input registries being sent from the first entity to the second entity comprised into one or several input files, those registries can also be sent directly from one table or data base of the first entity to another one of the second entity, or using other transmission mechanisms.

In a particular embodiment the protected mobile software application is inputted to a quality control system of the second entity, in charge to determine whether the security parameters and/or the obfuscation rules have been properly personalized into the protected mobile software application. So in this manner e.g. an electrical failure occurring during the security personalization may be identified before the second entity sends a protected mobile software application to the first entity.

In a particular embodiment, the second entity stores the output registries in at least one output file and stores the at least one output file into its systems.

In another particular embodiment, the at least one output file is sent by the second entity to the first entity, and the first entity stores it into its systems. So in this manner the first entity has available at its systems the information about the security protection that at least partly applies to each one of the replicas of a given mobile software application.

In a particular embodiment, the first entity assigns the at least one unique identifier of the input registry to a particular user before sending the set of input registries to the second entity, thus the protected mobile software application is already assigned to a given user when received by the first entity from the second entity.

In another particular embodiment, the same protected mobile software application is assigned to all user mobile devices. In this way the mobile software application protection is applied per user, and not per device, but making still difficult enough for an attacker to attack many protected mobile software applications if he has succeed in cracking the security of one.

In another particular embodiment, a different protected mobile software application is assigned to each one of the user mobile devices. Advantageously this approach provides a per user and per device protection to a given mobile software application.

In a particular embodiment, the first entity assigns the at least one unique identifier of the input registry, and the protected mobile software application, to a particular user after having received the corresponding protected mobile software application from the second entity and after the user has successfully become registered into a service of the service provider by using the protected mobile software application. So the assignment is performed as a result of the user interest in receiving services through the protected mobile software application.

In another particular embodiment, the first entity assigns the at least one unique identifier of the input registry, and the protected mobile software application, to a particular mobile device of a user after having received the corresponding protected mobile software application from the second entity and after the user has successfully become registered into a service of the service provider by using the protected mobile software application. So in this case the assignment is also performed as a result of the user interest in receiving services through the protected mobile software application, but it is made on per user mobile device basis.

In a particular embodiment, some of the security parameters personalized into the protected mobile software application are sent to the first entity in the context of an on-line connection from the mobile software application, and the first entity validates the security parameters. Advantageously, the first entity is able to determine whether those parameters are valid and, if not, disable the protected mobile software application into the first entity system.

In a particular embodiment, the protected mobile software application is downloaded to the user mobile device as a result of another application, that is previously installed into said user mobile device, addressing a particular remote address, and at least one of the on-line services is not available for the protected mobile software application if a successful registration process that requires the user entering an activation code into the protected mobile software application has not been completed within a given time period after the protected mobile software application has been downloaded to the user mobile device, such time period being defined by the first entity. The referred another application may be e.g. a "launcher" application (able to link to a particular e.g. web address) or a browser at the mobile.

A first advantage of this embodiment is that the protected mobile software application can only be downloaded from remote address/es defined by the first entity. In some embodiments the user must login and sign the remote request to make the protected mobile application being downloaded to the mobile device.

A second benefit of this embodiment is that there is a limited time period for the user to complete the registration process, thus there is limited time period for a hacker to attack the application before the registration process ends. If that time period is exceeded one or several on-line services will not be available through the protected mobile software application. This countermeasure may be of major interest for a service provider in connection to e.g. on-line services where payments are involved (e.g. NFC or ecommerce payments performed using the protected mobile software application), that may be restricted if the registration is performed out of the defined time window. In a particular implementation, if the time period is exceeded the first entity disables the protected mobile software application at its systems so no on-line services will be available through the mobile application.

In a particular embodiment, the protected mobile software application is used to provide a set of on-line services to the user and at least one of those on-line services is not available for the protected mobile software application until it has been registered into the first entity systems by the user entering an activation code at the mobile device and selecting a PIN, the PIN being required to have access to the at least one on-line service.

In a particular implementation the user selects the PIN by entering it into the mobile device, as part of the protected mobile software application registration process.

So in this embodiment usage of the protected mobile software application may be restricted until the user successfully performs a secure registration process (e.g. the activation code is obtained after the user has logged into the service provider web page and has signed the request, and it has a limited time validity).

In another particular embodiment, the protected mobile software application is used to provide on-line mobile contactless payment services to the user and those payment services are not available for the protected mobile software application until the first entity downloads to the protected mobile software application at least a part of at least one credential to be used for the on-line contactless payment services. In a particular example the at least a part of the at least one credential is downloaded during the protected mobile software application registration process, after the user enters an activation code at the mobile device and selects a PIN, the PIN being required to make on-line mobile contactless payments. In another example it is downloaded after the registration process, as a result of the user inserting the PIN at the mobile application and the first entity verifying it is correct.

So in this embodiment usage of the protected mobile software application may be also restricted until at least a part of at least one credential is available into the protected mobile payment application (and receiving such at least a part of at least one credential at the protected mobile software application typically requires the user inserting an activation code—e.g. obtained through other channel—and/or inserting a PIN—to be verified by the first entity —).

In a particular embodiment, at least one data of the output personalization registry was not used to generate the protected mobile software application that is associated to the output registry and to the at least one unique identifier, and at least part of those data are sent to the first entity, and the first entity at least partly re-personalizes the protected mobile software application, in terms of at least part of the security parameters and/or the obfuscation rules, using at least part of those data. So using this embodiment the security parameters and/or obfuscation rules may be renewed in the protected mobile software application when the current security personalization expires or is close to expire.

In a particular embodiment, a new output personalization registry, associated to the at least one unique identifier, is generated by the second entity during the life cycle of a given protected mobile software application, and at least part of this new output registry is sent to the first entity, and the first entity at least partly re-personalizes the protected mobile software application, in terms of at least part of the security parameters and/or the obfuscation rules, using data included into the new output registry. So if security personalization data into the previous output registry has been consumed or has expired, the second entity may generate new data and send them to the first entity to re-personalize the protected mobile software application in terms of security parameters and/or obfuscation rules.

In a particular embodiment, one or several processes belonging to the domain of the first entity are provided by the second entity, or by a trusted third party, on behalf of the first entity. In a particular example the user requests of a replica of the mobile software application is received by the second entity, that downloads a protected mobile software application, and assigns it to a given user mobile device, on behalf of the first entity. In other example the assignment is made by a trusted third party, on behalf of the first entity, after the user has successfully become registered into a service of the service provider by using the protected mobile software application.

In a particular embodiment, one or several processes of the second entity are provided by the first entity or by a third party, on behalf of the first entity. In a particular example the first entity is the security personalizer of mobile phone software applications.

A second aspect of the invention is directed to a system to automatically generate mobile device software applications, where each one is differently personalized in terms of security parameters and/or obfuscation rules, said system comprising:

Generation means to allow a first entity to generate a set of input registries, each input registry containing at least a unique identifier.

Security personalization means to allow a second entity to personalize mobile device software applications, after receiving the set of input registries, using the at least one unique identifier included in an input registry to generate an output personalization registry.

Transmission means for the second entity sending protected mobile software applications to the first entity, each one associated to one or several unique identifiers from the corresponding input registry.

Storage means for the first entity storing the protected mobile software applications and the association to at least one of the unique identifiers.

User interface means to allow the user requesting a replica of the mobile software application to the first entity.

Transmission means for a protected mobile software application being downloaded by the first entity to a user mobile device.

Where the output registry is different than another output registry, generated from another input registry, in terms of security parameters and/or obfuscation rules for personalization, and the data of the output registry is to be at least partly inputted to a generic replica of a mobile device software application, and the second entity uses the at least part of the output registry, the generic replica of the mobile device software application and obfuscation software to generate a protected mobile software application that is associated to the output registry and to the at least one unique identifier, being this protected mobile software application different in terms of security parameters and/or obfuscation rules than another one obtained using at least part of another output registry.

Patent document U.S. 2013/0042300 describes a method to provide a given security level to an application into an end device but such a method is only to be applied after the application has already been downloaded to such end device, as the query for a new security level is in fact made from the application itself. On the contrary, in the context of the invention, a security protection is provided to the mobile software application before the application is downloaded to the mobile device, thus the security process is entirely managed at a central level and the security is applied at that level, before application downloading. Advantageously, in comparison with U.S. 2013/0042300, the invention allows applying the security protection a priori, thus the application downloaded to the mobile device is already protected.

Furthermore, U.S. 2013/0042300 refers to a central place assigning, as a result of a query from the application in the end user device, a predefined security configuration from a limited set of possible configurations for that type of end-device. Thus U.S. 2013/0042300 relates to a set of possible application security configurations, not to a per user application security personalization. There is no hint in U.S. 2013/0042300 about applying a different application security personalization per user, or per user device. On the contrary, the invention refers to the user requesting a replica of the mobile software application, and a protected mobile software application, that is different in terms of security parameters and/or obfuscation rules than any other, is downloaded to the user mobile device. Thus the invention provides mechanisms to deliver a security protection to the application that is different per user (thus preventing a massive attack to the mobile software application)

Last, but not less important is the fact that U.S. 2013/0042300 indicates that one or several functions of the application are configured on the basis of the applied security configuration (e.g. as a result of the new security configuration a PIN is now required to access to a given feature). So in U.S. 2013/0042300 the application functionally is directly affected by the new security configuration. On the contrary, in the context of the invention the applied protection does not affect to the application functionality, but simply provides a per user protection, based on obfuscation techniques, to the mobile software application. In other words, the protection does not have any impact on the functionality provided by the application to the end user.

BRIEF DESCRIPTION OF THE DRAWINGS

In the following detailed description of some possible embodiments, other features and advantages of the invention will appear, each description being made with reference to the following drawings.

DETAILED DESCRIPTION

Figure 1:
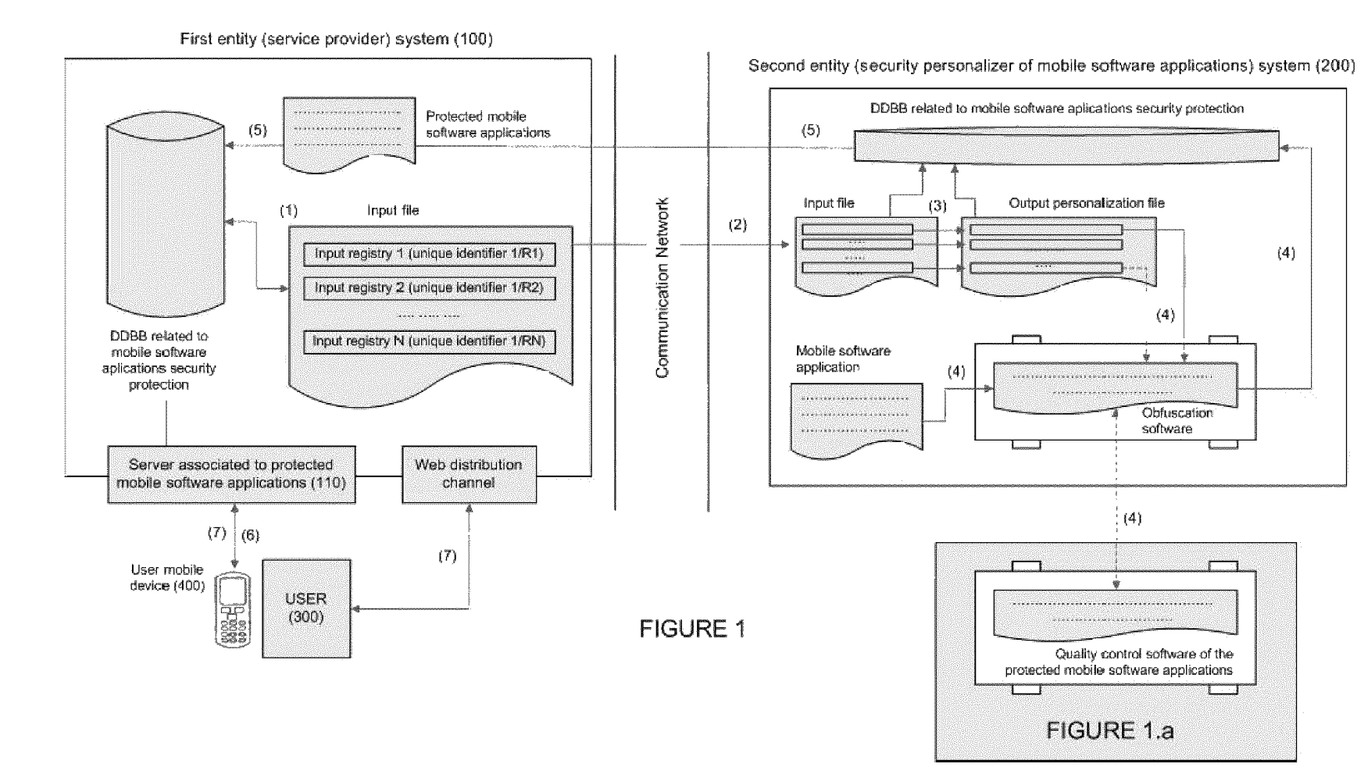
FIG. 1 is a schematic diagram illustrating several embodiments of an automated and personalized protection system for mobile applications according to the invention.

FIG. 1 is a schematic diagram illustrating an embodiment of an automated and personalized protection system for mobile applications according to the invention.

This figure shows the system (100) of a first entity, that is a service provider, and the system (200) of a second entity, that is a security personalizer of mobile software applications. Both of them are prepared to execute a method according to the invention.

In step (1) the first entity generates an input file comprising a set of input registries, each input registry containing at least a unique identifier. FIG. 1 illustrates a particular example where there is a single unique identifier (i) associated to each input registry (i). This unique identifier may be a unique transaction code associated to the input registry. Still in step (1), the input file is stored into the databases (DDBB) of the first entity that relates to mobile software applications security protection, according to the invention.

In step (2) the first entity sends the input file, and the second entity receives it.

In step (3) the second entity generates an output personalization file from data included in the input file, generating an output registry on the output file for each one of the input registries into the input file. The unique identifier (i) of input registry (i) is used to generate the output registry (i). In a particular example the unique identifier (i) is simply part of the output registry (i); in another example the unique identifier (i) is also used to calculate personalization data of the output registry (i). Still in step (3) both the input file and the output personalization file are stored into the DDBB of the second entity that relates to mobile software applications security protection, according to the invention.

So in this embodiment, the second entity stores the output registries in at least one output file and stores the at least one output file into its systems.

The personalization data of a given output registry (i) are calculated in step (3) to be different that the personalization data of another output registry (j). In a particular implementation it is achieved by using the unique identifier (i) as input for calculation of output registry (i) personalization data and the unique identifier (j) as input for calculation of output registry (j) personalization data.

In the context of the invention each output registry contains data that will be later used, at least partly, to protect a mobile software application. In this embodiment those data would be used as security parameters, and also to define obfuscation rules, to protect a mobile software application. To achieve that, the data will be inputted to a generic replica of a given mobile phone software application.

So in this embodiment a second entity, being a security personalizer of mobile device software applications, receives the input file and uses the at least one unique identifier included in an input registry to generate an output personalization registry, where this output registry is different than another output registry, generated from another input registry, in terms of security parameters and/or obfuscation rules for personalization, and the data of the output registry is to be at least partly inputted to a generic replica of a mobile device software application.

In step (4) the second entity uses the security personalization data into output registry 1 as data to be inputted to obfuscation software, able to obfuscate a generic replica of the mobile software application by using the referred output registry 1 personalization data. The result of the obfuscation process is a protected mobile software application that is associated to the output registry 1 and to the related unique identifier 1, the protection being related to personalized security parameters and obfuscation rules. The process is repeated for each one of the output registries of the output personalization file, so N protected mobile software applications are generated, each one associated to its corresponding output registry and unique identifier. Still in step (4) the N protected mobile software applications and the association of each one to the corresponding output registry and unique identifier are stored into the DDBB of the second entity that relates to mobile software applications security protection, according to the invention.

As described above, the personalization data of a given output registry (i) are calculated to be different that the personalization data or another output registry (j). So the protected mobile software application associated to the output registry (i) and to the related unique identifier (i) will be different, in terms of personalized security parameters and/or obfuscation rules, than the protected mobile software application associated to the output registry (j) and to the related unique identifier (j).

So in this embodiment the second entity uses the at least part of the output registry, a generic replica of the mobile device software application and obfuscation software to generate a protected mobile software application that is associated to the output registry and to the at least one unique identifier, being this protected mobile software application different in terms of security parameters and/or obfuscation rules than another one obtained using at least part of another output registry.

In step (5) the second entity sends the protected mobile software applications to the first entity, each one associated to the corresponding unique identifier from the corresponding input registry, and the first entity receives and stores them into the DDBB of the first entity that relates to mobile software applications security protection, according to the invention.

So the second entity sends the protected mobile software applications to the first entity, each one associated to one or several unique identifiers from the corresponding input registry, and the first entity stores them and the association to at least one of the unique identifiers.

In a particular implementation the second entity also sends to the first entity in step (5) the output personalization file. So in this particular implementation, the at least one output file is sent by the second entity to the first entity, and the first entity stores it into its systems.

In this embodiment, the first entity assigns the unique identifier of each input registry to a particular user in step (1), before sending the input file to the second entity, so the DDBB of the first entity that relates to mobile software applications security protection would have this assignment stored from step (1).

So in this embodiment, the first entity assigns the at least one unique identifier of the input registry to a particular user before sending the set of input registries to the second entity, thus the protected mobile software application is already assigned to a given user when received by the first entity from the second entity. And the same protected mobile software application will be assigned to all user mobile devices.

In step (6) a user (300) requests a replica of the mobile software application to the first entity. In this embodiment the user has previously downloaded into his mobile device (400) an installer application from an applications store, and sends a request to receive a replica of the mobile software application by using the installer application into the mobile device. The request is sent to the server of the first entity associated to protected mobile software applications. The first entity searches into the DDBB for the protected mobile software application assigned to the user in step (1) and the applications server downloads it to the user mobile device.

So in this embodiment, a user requests a replica of the mobile software application to the first entity and a protected mobile software application is downloaded to a user mobile device.

FIG. 1 also illustrates other embodiment according to the invention, where the assignment of the unique identifier of each input registry to a particular user is not made in step (1), but after the user has successfully become registered into at least part of the services of the service provider that relates to the usage of the protected mobile software application.

In this embodiment once the protected mobile software application has been downloaded in step (6), in step (7) the user obtains an activation code via the web page of the service provider, after successful login and transaction signature.

As a result of the user inserting the activation code into the protected mobile software application, the application initiates (e.g. via https) a secure registration process onto the referred services via the server of the first entity associated to protected mobile software applications, the process including sending the activation code from the mobile software protected application to the server of the first entity, and once the registration has been successfully completed, the first entity assigns, into the DDBB for the protected mobile software applications, the protected mobile software application to the user. Therefore the assignment is performed as a result of the user interest in receiving services through the protected mobile software application.

So in this embodiment, the first entity assigns the at least one unique identifier of the input registry, and the protected mobile software application, to a particular user after having received the corresponding protected mobile software application from the second entity and after the user has successfully become registered into a service of the service provider by using the protected mobile software application.

FIG. 1 also illustrates another embodiment according to the invention, where the assignment of the unique identifier of each input registry to a particular user is not made in step (1), but after the user has successfully become registered into at least part of the services of the service provider that relates to the usage of the protected mobile software application.

In this embodiment once the protected mobile software application has been downloaded in step (6), in step (7) the user obtains an activation code via the web page of the service provider, after successful login and transaction signature.

As a result of the user inserting the activation code into the protected mobile software application, the application initiates (e.g. via https) a secure registration process onto the referred services via the server of the first entity associated to protected mobile software applications, the process including sending the activation code and at least one unique mobile device identifier from the mobile software protected application to the server of the first entity, and once the registration has been successfully completed, the first entity assigns, into the DDBB for the protected mobile software applications, the protected mobile software application to the user mobile device. Therefore in this case the assignment is also performed as a result of the user interest in receiving services through the protected mobile software application, but it is made on per user mobile device basis.

So in this embodiment, the first entity assigns the at least one unique identifier of the input registry, and the protected mobile software application, to a particular mobile device of a user after having received the corresponding protected mobile software application from the second entity and after the user has successfully become registered into a service of the service provider by using the protected mobile software application.

Considering that in this embodiment the assignment of the protected mobile software application is per user device, if the same user would later request a replica of the mobile software application to be downloaded to another one of his mobile devices, the downloaded protected mobile software application would be different, in terms of security parameters and/or obfuscation rules, than any other one previously downloaded into another device of that user.

Therefore, in this embodiment a different protected mobile software application is assigned to each one of the user mobile devices.

The first three embodiments above may be used to highly protect a multiplicity of mobile software applications on per user or per user mobile device basis. The embodiments could be applied to trading/broker applications from banks, multimedia messaging applications from telecoms or smartphone vendors, couponing applications from merchants, applications from transport operators offering routes discovery to its users or mobile social media applications.

In the context of any of those exemplary embodiments a protected replica of a mobile software application into a mobile device of a user is always different than another protected replica of the same mobile software application into a mobile device of another user, in terms of security parameters and/or obfuscation rules.

So implementing any of those embodiments implies that, in connection to certain types of attacks, a hacker trying to get unauthorized control of a first protected mobile software application replica into a mobile device of one user would need to dedicate the same effort to get unauthorized control of another protected mobile software application replica into a mobile device of another user, and successively, so the incentive for a massive attack is reduced drastically. As a particular example, if an attacker has been able to obtain a secret data obfuscated into the code of a protected replica of a mobile software application into one device of a user, as a result of having obtained the obfuscation rule for that application replica and that secret data, he will need to dedicate the same time again to obtain the equivalent secret data obfuscated into the code of another protected replica of the same mobile software application into a mobile device of other user.

On top of the above protection, it is also possible to add additional [per user/per user device] protection to mobile software applications, in terms of whether giving or not to those applications the right to access to certain on line services. Giving the protected mobile software application access to certain on-line services only as a result of the user having successfully selected a PIN via the application, or having completed the application registration process within a limited predefined time period, or having obtained certain credentials that are required for on-line services, provides to the service provider with additional security protection and higher control. This additional protection level may be adequate for protected mobile software applications handling either payment or ticketing services.

FIG. 1 also illustrates another embodiment according to the invention, where the user has downloaded into his mobile device, before step (6), an installer application from an applications store. Within this embodiment the user will have a limited period of time to register his protected mobile software application.

In step (6) the user request a replica of the mobile software application to the first entity by using the installer application into the mobile device. As in some of the previous embodiments, in this exemplary embodiment the assignment of the at least one unique identifier of the input registry, and the protected mobile software application, to a particular mobile device of a user is made after the user has successfully become registered into at least part of the services of the service provider that relates to the usage of the protected mobile software application.

In this embodiment once the protected mobile software application has been downloaded in step (6), in step (7) the user obtains an activation code via the web page of the service provider, after successful login and transaction signature.

As a result of the user inserting the activation code into the protected mobile software application, the application initiates (e.g. via https) a secure registration process onto the referred services via the server of the first entity associated to protected mobile software applications, the process including sending the activation code and at least one unique mobile device identifier from the mobile software protected application to the server of the first entity, and once the registration has been successfully completed, the first entity assigns, into the DDBB for the protected mobile software applications, the protected mobile software application to the user mobile device.

In this embodiment there is a predefined and limited period of time after the protected mobile software application has been downloaded to the user mobile device for the registration process to be completed; if the predefined period of time is exceeded, then the first entity will disable certain on-line services for the protected mobile software application.

So in this embodiment, the protected mobile software application is downloaded to the user mobile device as a result of another application, that is previously installed into said user mobile device, addressing a particular remote address, and at least one of the on-line services is not available for the protected mobile software application if a successful registration process that requires the user entering an activation code into the protected mobile software application has not been completed within a given time period after the protected mobile software application has been downloaded to the user mobile device, such time period defined by the first entity.

In this embodiment the protected mobile software application can only be downloaded from remote address/es defined by the first entity.

Advantageously, the first entity may use at least part of the security parameters, obfuscated into the mobile software application, to verify the authenticity of the application during the registration process.

And there is a limited time period for the user to complete the registration process, thus there is limited time period for a hacker to attack the application before the registration process ends. As a particular example a bank service provider may block NFC or ecommerce on-line mobile payments at the payments server, when those are made via a protected mobile software application that was not registered within the predefined period of time.

Figure 2:
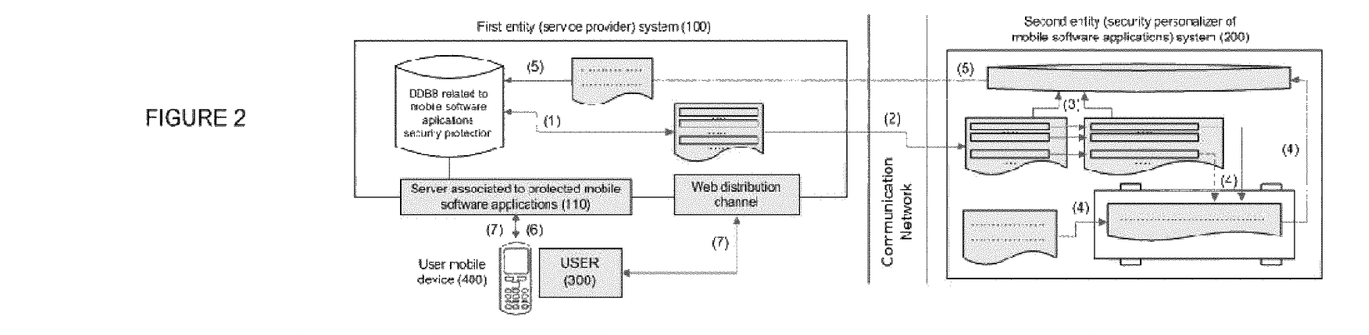
FIG. 2 is a schematic diagram illustrating other embodiments of an automated and personalized protection system for mobile applications according to the invention.

FIG. 2 illustrates another embodiment according to the invention. For better understanding, this embodiment is described in connection to document PCT/EP2013/066540, which belongs to the same applicant as the present application. Document PCT/EP2013/066540 relates to a method to enable mobile contactless ticketing/payments via a mobile phone application. In particular, FIG. 2.*b* of document PCT/EP2013/066540 shows an exemplary payment system to enable mobile contactless payments via a mobile phone application where:

In step (5) an activation code is generated. In step (7) the user inserts the activation code into the mobile phone payment application and in step (8) the mobile phone sends to the payments server module, e.g. via https, the [activation code and the hash (mobile device identity number & activation code)].

In step (10) card "A" is pre personalized at the mobile phone application. When step (10) ends the user is already registered into the system of the invention.

In step (11) the user is prompted to select a Personal Identification Number (PIN) for mobile contactless payment services. The PIN value is not stored at the mobile phone payment application but is securely sent in step (12) to the payments server module, together with a One-Time-Password (OTP) calculated using the PIN value (and the Activation Code and hash (AC&ID) values). In step (13) the PIN is stored at the payments server module data base, together with the keys and parameters to calculate a PIN-based OTP result.

Still in step (13), the payments server module calculates an OTP result using the stored user PIN and OTP keys and parameters, and compares the result with the one received from the mobile phone payment application. If validation is successful then payment credentials can be sent to the mobile phone payment application. So the payments server module send credentials to the registered user mobile phone after successful validation of a One Time Password (OTP) received from the mobile phone payment application.

In step (14) a first set of credentials (e.g. credentials from i=1 to i=j, j<n) are sent to the mobile phone payment application; the user mobile phone receives the credentials and stores them for use at merchant locations equipped with contactless Point of Sale Terminals.

The registered user can in step (15) use the mobile phone to pay at merchants equipped with contactless Point of Sale Terminals. In step (15) the user shall insert his PIN code at the mobile phone payment application before trying to pay at the contactless Point of Sale Terminal 4000.

So in the previous exemplary payment system of PCT/EP2013/066540, the mobile phone application registration process start in step (5) (when an activation code is generated) and ends in step (14) (after the user has selected a PIN for mobile contactless payments and a first set of credentials for mobile contactless payments has been stored into the mobile phone payment application).

In the context of the present invention to provide an automated and personalized protection for mobile software applications, and in connection to the above exemplary payment system of PCT/EP2013/066540, if may be of interest for the first entity to restrict on-line mobile contactless payments through the mobile device application until the user has not successfully finalize the secure registration process (that comprises the user selecting a PIN to be used for mobile contactless payments).

In as particular implementation where the first entity is a Bank, the payments server module of PCT/EP2013/066540 could even be the same server that the one referred to in this invention, associated to the protected mobile software applications. So in this case it would be easy to restrict on-line mobile contactless payments until the protected mobile software application (named as mobile phone application in PCT/EP2013/066540) has been registered into the first entity systems by the user entering an activation code at the mobile device and selecting a PIN, the PIN being required to make mobile contactless payments.

Now, FIG. 2 of the present invention combines the system disclosed in FIG. 1 of the present invention with the system disclosed in FIG. 2b of PCT/EP2013/066540. To facilitate understanding, the processes illustrated in FIG. 2.b as steps (5) to (14) are named herein as step (7) in the context of FIG. 2. That is, step (7) of this embodiment of the invention refers to the process of registering the mobile software application, selecting a PIN for on-line mobile contactless payments, and getting the credentials for mobile contactless payments.

So in this embodiment, the protected mobile software application is used to provide a set of on-line services to the user and at least one of those on-line services is not available for the protected mobile software application until it has been registered into the first entity systems by the user entering an activation code at the mobile device and selecting a PIN, the PIN being required to have access to the at least one on-line service.

Also, as another particular implementation where the first entity is a Bank and the payments server module of PCT/EP2013/066540 is the same server that the one of the first entity referred to in this invention, the on-line mobile contactless payments are restricted until the protected mobile software application has been registered into the first entity systems by the user entering an activation code at the mobile device and selecting a PIN, the PIN being required to make mobile contactless payments, and until the first entity downloads to the protected mobile software application a set of credentials to be used for the on-line contactless mobile payment services.

To make understanding easier, the processes illustrated in FIG. 2.b as steps (5) to (14) are named as step (7) in the context of FIG. 2. It is, step (7) of this embodiment of the invention refers to the process of registering the mobile software application and getting the credentials for mobile contactless payments So in this embodiment, the protected mobile software application is used to provide on-line mobile contactless payment services to the user and those payment services are not available for the protected mobile software application until the first entity downloads to the protected mobile software application at least a part of at least one credential to be used for the on-line contactless mobile payment services.

FIGS. 3a-3c illustrate a part of another embodiment according to the invention. In this part of an embodiment, only part of the output personalization registry is used to generate the protected mobile software application and another part is used for future security re-personalizations of the protected mobile software application.

So using this embodiment the security parameters and/or obfuscation rules may be renewed in the protected mobile software application when the current security personalization expires or is close to expire.

Figure 3:
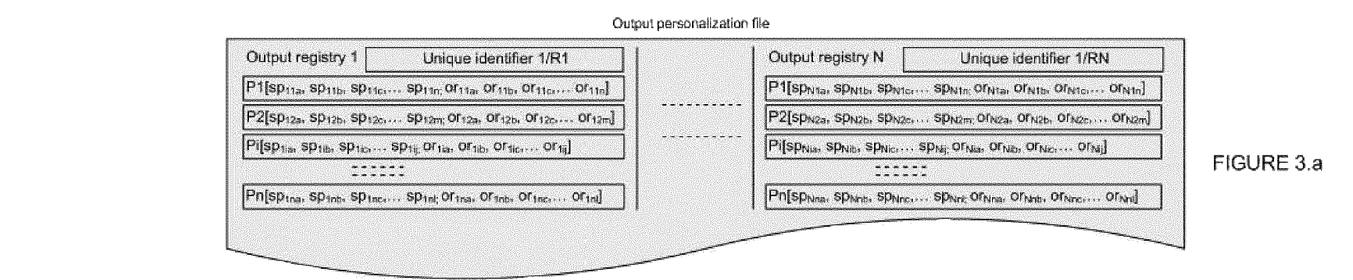
FIGS. 3a-3c illustrate a part of several embodiments according to the invention.

In the context of this embodiment, FIG. 3.a shows an output personalization file with N output registries, each one with one unique identifier.

Output personalization registry 1 contains a first set of security parameters $[sp_{11a}, sp_{11b}, sp_{11c}, \ldots sp_{11n}]$ associated to a first set of obfuscation rules $[or_{11a}, or_{11b}, or_{11c}, \ldots or_{11n}]$, a second set of security parameters $[sp_{12a}, sp_{12b}, sp_{12c}, \ldots sp_{12m}]$ associated to a second set of obfuscation rules $[or_{2a}, or_{12b}, or_{12c}, \ldots or_{12m}] \ldots$ and a $n^{th}$ set of security parameters $[sp_{1na}, sp_{1nb}, sp_{1nc}, \ldots sp_{1nl}]$ associated to a $n^{th}$ set of obfuscation rules $[or_{1na}, or_{1nb}, or_{1nc}, \ldots or_{1nl}]$ and $[sp_{11a}, sp_{11b}, sp_{11c}, \ldots sp_{11n}]$ and $[or_{11a}, or_{11b}, or_{11c}, \ldots or_{11n}]$ are used to initially personalize, in terms of security parameters and obfuscation rules, the protected mobile software application;

$[sp_{12a}, sp_{12b}, sp_{12c}, \ldots sp_{12m}]$ and $[or_{12a}, or_{12b}, or_{12c}, \ldots or_{12m}]$ will be used to perform a first re-personalization of the protected mobile software application, in terms of security parameters and obfuscation rules;

....

$[sp_{1na}, sp_{1nb}, sp_{1nc}, \ldots sp_{1nl}]$ and $[or_{1na}, or_{1nb}, or_{1nc}, \ldots or_{1nl}]$ will be used to perform a (n–1) re-personalization of the protected mobile software application, in terms of security parameters and obfuscation rules;

and $[sp_{1(i-1)a}, sp_{1(i-1)b}, sp_{1(i-1)c}, \ldots sp_{1(i-1)k}]$ and $[or_{1(i-1)a}, or_{1(i-1)b}, or_{(1(i-1)c}, \ldots or_{1(i-1)k}]$ are replaced by $[sp_{1ia}, sp_{1ib}, sp_{1ic}, \ldots sp_{1ij}]$ and $[or_{1ia}, or_{1ib}, or_{1ic}, \ldots or_{1ij}]$ in the context of (i–1) security re-personalization process. The same logic may be applied to output personalization registries 2 to N.

In this particular implementation a set of "empty" registers has been personalized into the protected mobile software application at first security personalization such that at least part of those can be used in the context of future security re-personalization processes.

In this embodiment, some of the security parameters personalized into the protected mobile software application are sent to the first entity in the context of an on-line connection from the mobile software application, and the first entity validates the security parameters. In a particular example $[sp_{11a}, sp_{11b}, sp_{11c}]$ are sent from the protected mobile software application to the first entity during the application registration process, after the application has obtained those values applying $[or_{11a}, or_{11b}, or_{11c}]$. If the values are not correct, the first entity will not allow the registration process to be completed, and will disable the protected mobile software application into its systems. The rest of the security parameters will be sent during the life cycle of the application, for validation by the first entity; if not correct, the application will be disabled at the first entity systems.

FIG. 3.b shows how $sp_{11a}$ has been divided in 4 parts and obfuscated into different locations into the protected mobile software application. The obfuscation rule $or_{11a}$ has been divided in two parts: a first part $or_{11a(start)}$, that allows to address $sp_{11a(part1)}$ from the application code, and a second part $or_{11a(part1)}$ that allows to address from the application code de following part of $sp_{11a}$. Each part refers to the next one until the one that is labeled as the end part in the obfuscation rule. FIG. 3.b also shows the empty locations where future security parameters and obfuscation rules can be placed. FIG. 3.c shows the result of a security re-personalization process where $sp_{12a}$, associated to the first re-personalization of output registry 1, is now divided in 5 parts and obfuscated into different locations into the protected mobile software application. Again, the obfuscation rule $or_{12a}$ has been divided in two parts: a first part $or_{12a(start)}$, that allows to address $sp_{12a(part1)}$ from the application code, and a second part $or_{12a(part1)}$ that allows to address from the application code de following part of $sp_{12a}$. The same logic may be applied to each one of the parameters/obfuscation rules and to each one of the output registries.

FIG. 3 is an illustrative example about using security parameters and obfuscation rules to protect the mobile software application, and many variances are possible without departing from the principles of this invention. As a particular example, depending on the value of a parameter that is included into the code of the protected mobile software application, the code could use $or_{11a(start)}$ to address $sp_{11a(part1)}$ when the security personalization is the initial one, and changing the value of that parameter, at the first security re-personalization, the code could later use $or_{12a(start)}$ to address $sp_{12a(part1)}$ when the security personalization is the one of the first re-personalization. The obfuscation rules may be different than those in these examples, as defined by the first issuer. And also some of the security parameters of the initial security personalization could be used, together with parts of the application code, to create a network of code checksums during the generation of the protected mobile software application, those checksums being embedded and obfuscated into the code at the time of generation of the protected mobile software application, and the code checksums being different than those of another protected mobile software application calculated upon the different security parameters of the first security personalization of the another protected mobile software application.

Advantageously, it shall be noted that before a re-personalization is made the related data are completely unknown by the protected mobile software application, as those obfuscation rules, and the related new security parameters, are at that time only available at the service provider systems (and sometimes at the second entity secured systems).

So in this embodiment, at least one data of the output personalization registry was not used to generate the protected mobile software application that is associated to the output registry and to the at least one unique identifier, and at least part of those data are sent to the first entity, and the first entity at least partly re-personalizes the protected mobile software application, in terms of at least part of the security parameters and/or the obfuscation rules, using at least part of those data.

In a different scenario, new output personalization registries are generated by the second entity during the life cycle of the protected mobile software applications and are sent to the first entity. Therefore, using this embodiment the security parameters and/or obfuscation rules may be renewed by the first entity into the protected mobile software application when all the parameters of the previous output registry have either been user or expired.

So in another embodiment, a new output personalization registry, associated to the at least one unique identifier, is generated by the second entity during the life cycle of a given protected mobile software application, and at least part of this new output registry is sent to the first entity, and the first entity at least partly re-personalizes the protected mobile software application, in terms of at least part of the security parameters and/or the obfuscation rules, using data included into the new output registry.

In a particular implementation of any of the previous two embodiments, it is required that the user will insert his PIN into the protected mobile software application, and the security re-personalization is performed when the first entity verifies that the user entered a correct PIN value. So when the user inserts the PIN to have access to a remote service from the service provider (e.g. via a Web Service) the first entity may take advantage of that on-going process to re-personalize the protected mobile software application in terms of security parameters and/or obfuscation rules.

In another particular implementation the security re-personalization process is initiated by the first entity in the context of an on-line request to the first entity initiated from the protected mobile software application. In this implementation the re-personalization process is initiated by the first entity without requiring the user inserting the PIN, thus the first entity may decide making the re-personalization e.g. based on risk management criteria.

FIG. 1 also illustrates a part of another embodiment according to the invention. In this part of an embodiment, there is a quality control system in charge to verify whether the security parameters and/or the obfuscation rules into the output registries has been properly personalized into the corresponding protected mobile software applications. This quality control system is targeted to identify any personalization error on the protected mobile software application as result of e.g. an electrical failure occurring during the security personalization process. The target is to be able identify it before the second entity sends a protected mobile software application to the first entity.

FIG. 1 illustrates how a protected mobile software application is generated in step (4). According to this embodiment, the generated application is sent to the quality control system of the second entity (FIG. 1.a) in charge to determine whether there is any security personalization error. In the context of this process the quality control system will also verify whether the "empty" registers have been properly personalized into the protected mobile software application. If there was a personalization error, it is reported to the system of the obfuscation software such that the security personalization process will be repeated. If the personalization was correct, step (4) finalizes by sending the protected mobile software application, and the association to the corresponding output registry and unique identifier to the DDBB of the second entity, according to the invention.

So in an embodiment, the protected mobile software application is inputted to a quality control system of the second entity, in charge to determine whether the security parameters and/or the obfuscation rules have been properly personalized into the protected mobile software application.

Although the present invention has been described in detail for purpose of illustration, it is understood that such detail is solely for that purpose, and variations can be made therein by those skilled in the art without departing from the scope of the invention. Thus, while the preferred embodiments of the method and of the mobile system have been described in reference to the environment in which they were developed, they are merely illustrative of the principles of the invention. Other embodiments and configurations may be devised without departing from the scope of the appended claims.

Further, although the embodiments of the invention described with reference to the drawings comprise computer apparatus (a computer apparatus is herein understood to be any electronic processing means capable of executing a sequence of steps encoded as a program) and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means. When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

The invention claimed is:

1. A method to automatically generate mobile device software applications, where each mobile device software application is differently personalized in terms of security parameters and obfuscation rules, said method comprising:
generating, at a first device associated with a service provider, a set of input registries, each input registry containing at least one unique identifier;
receiving, at a second device associated with a security personalizer of mobile device software applications, the set of input registries and generating, using the at least one unique identifier included in a first input registry, a first output personalization registry that comprises security parameters and an obfuscation rule, where the first output personalization registry is different than a second output personalization registry generated from a second input registry, in terms of the security parameters and the obfuscation rule for personalization;
generating, at the second device using at least part of data of the first output personalization registry, a generic replica of a mobile device software application and obfuscation software, a protected mobile software application that is associated with the first output personalization registry and with the at least one unique identifier, wherein the at least part of the data of the first output personalization registry comprises at least part of the security parameters and the obfuscation rule, and wherein the protected mobile software application is different in terms of security parameters and the obfuscation rule than another protected mobile software application obtained using at least part of a second output personalization registry, and the protected mobile software application comprising the at least part of the security parameters and the obfuscation rule;
sending, from the second device, a plurality of protected mobile software applications to the first device, each protected mobile software application associated to one or several unique identifiers from a corresponding one of the set of input registries, and the first device stores the plurality of protected mobile software applications and the association to at least one of the unique identifiers;
receiving, at the first device from a user mobile device, a request for a replica of the mobile device software application; and
sending one of the plurality of protected mobile software applications to the user mobile device.

2. The method according to claim 1, further comprising:
inputting the protected mobile software application to a quality control system of the second device; and
determining, via the quality control system, that the security parameters and the obfuscation rule has been properly personalized into the protected mobile software application.

3. The method according to claim 1, further comprising storing, at the second device, the output personalization registries in at least one output file.

4. The method according to claim 3, further comprising:
sending the at least one output file from the second device to the first device; and
storing the at least one output file at the first device.

5. The method according to claim 1, wherein some of the security parameters personalized into the protected mobile software application are sent to the first device via an on-line connection from the protected mobile software application, and the first device validates the sent some of the security parameters.

6. The method according to claim 1, where the protected mobile software application is sent to the user mobile device via another application that is previously installed into said user mobile device, addressing a particular remote address.

7. The method according to claim 6, wherein the protected mobile software application is used to provide a set of on-line services to a user and at least one of the on-line services is not available for the protected mobile software application if a successful registration process that requires the user entering an activation code into the protected mobile software application has not been completed within a given time period after the protected mobile software application has been received at the user mobile device, the time period defined by the first device.

8. The method according to claim 1, where the protected mobile software application is used to provide a set of on-line services to the user and at least one of those on-line services is not available for the protected mobile software application until it has been registered into the first device by the user entering an activation code at the mobile device and selecting a PIN, the PIN being required to have access to the at least one on-line service.

9. The method according to claim 1, where the protected mobile software application is used to provide on-line mobile contactless payment services to a user and the on-line mobile contactless payment services are not available for the protected mobile software application until the first device sends to the protected mobile software application at least a part of at least one credential to be used for the on-line mobile contactless payment services.

10. The method according to claim 1, where at least one data of the output personalization registry was not used to generate the protected mobile software application that is associated to the output personalization registry and to the at least one unique identifier, and at least part of the at least one data are sent to the first device, and the first device at least partly repersonalizes the protected mobile software application, in terms of the security parameters and the obfuscation rule, using the sent at least part of the at least one data.

11. The method according to claim 1, where a new output personalization registry, associated to the at least one unique identifier, is generated by the second device during a life cycle of a given protected mobile software application, and at least part of the new output personalization registry is sent to the first device, and the first device at least partly re-personalizes the protected mobile software application, in terms of at least part of the security parameters and the obfuscation rule, using data included into the new output registry.

12. The method according to claim 11, where a set of empty registers is provided in the protected mobile software application when generating the protected mobile software application, allowing for at least part of said empty registers to be used in a future security re-personalization processes.

13. The method according to claim 1, where one or several processes belonging to a domain of the first device are provided by the second device, or by a trusted third party device, on behalf of the first device.

14. The method according to claim 1, where one or several processes of the second device are provided by the first device or by a trusted third party device, on behalf of the first device.

15. The method according to claim 1, where the first device assigns the at least one of the unique identifiers of the corresponding one of the input registries to a particular user before sending the set of input registries to the second device, thus the protected mobile software application is already assigned to a given user when received by the first device from the second device.

16. The method according to claim 1, where the first device assigns the at least one of the unique identifiers of the corresponding one of the input registries, and the protected mobile software application, to a particular user after having received the protected mobile software application from the second device and after the user has successfully become registered into a service of the service provider by using the protected mobile software application.

17. The method according to claim 1 where the first device assigns the at least one of the unique identifiers of the corresponding one of the input registries, and the protected mobile software application, to a particular mobile device of a user after having received the protected mobile software application from the second device and after the user has successfully become registered into a service of the service provider by using the protected mobile software application.

18. The method according to claim 1, where some of the security parameters of the output personalization registry are used, together with parts of the mobile device software application, to create a network of code checksums during the generation of the protected mobile software application, the code checksums being embedded into code of the mobile device software application at a time of generation of the protected mobile software application, and the code checksums being different than those of the another protected mobile software application calculated upon different security parameters of the second output registry.

19. The method according to claim 18, where at least part of the personalized security parameters and the network of code checksums are obfuscated using at least part of the obfuscation rule.

20. The method according to claim 1, where a personalized security parameter is obfuscated using a dedicated obfuscation rule.

21. The method according to claim 1, where the first device is also a security personalizer of mobile software applications.

22. One or more tangible, non-transitory computer readable media encoded with instructions, wherein the instructions, when executed by a processor, are operable to:
generate, at a first device associated with a service provider, a set of input registries, each input registry containing at least one unique identifier;
receive, at a second device associated with a security personalizer of mobile device software applications, the set of input registries and generate, using the at least one unique identifier included in a first input registry, a first output personalization registry that comprises security parameters and an obfuscation rule, where the first output personalization registry is different than a second output personalization registry generated from a second input registry, in terms of security parameters and the obfuscation rule for personalization;
generate, at the second device using at least part of data of the first output personalization registry, a generic replica of a mobile device software application and obfuscation software, a protected mobile software application that is associated with the first output personalization registry and with the at least one unique identifier, wherein the at least part of the data of the first output personalization registry comprises at least part of the security parameters and the obfuscation rule, and wherein the protected mobile software application is different in terms of the security parameters and the obfuscation rule than another protected mobile software application obtained using at least part of a second output personalization registry, and the protected mobile software application comprising the security parameters and the obfuscation rule;
send, from the second device, a plurality of protected mobile software applications to the first device, each protected mobile software application associated to one or several unique identifiers from a corresponding one of the input registries, and the first device stores the plurality of protected mobile applications and the association to at least one of the unique identifiers;
receive, at the first device from a user mobile device, a request for a replica of the mobile device software application; and
send one of the plurality of protected mobile software applications to the user mobile device.

23. A system to automatically generate mobile device software applications, where each mobile device software application is differently personalized in terms of security parameters and obfuscation rules, said system comprising:
a memory;
a user interface;
a network interface configured to communicate over a network; and
one or more processors, wherein the one or more processors are configured to:
generate a set of input registries, each input registry containing at least one unique identifier, wherein the set of input registries is generated by a processor associated with a first entity;
personalize mobile device software applications, after receiving the set of input registries, using the at least one unique identifier included in a first input registry to generate a first output personalization registry that comprises security parameters and an obfuscation rule, wherein the mobile device software applications are generated by a processor associated with a second entity;
transmit via the network interface, protected mobile software applications, each one of the protected mobile software applications associated to one or several unique identifiers from a corresponding one of the set of input registries;
store, in the memory, the protected mobile software applications and the association to the at least one of the unique identifiers,
receive, via the user interface, a request for a replica of the mobile device software application; and transmit, via the network interface, the protected mobile software application to a user mobile device, wherein the first output personalization registry associated with the protected mobile software application is different from a second output personalization registry generated from a second input registry, in terms of the security parameters and the obfuscation rule for personalization, wherein data of the first output personalization registry is to be at least partly inputted to a generic replica of the mobile device software application, wherein the second entity uses at least part of the first output personalization registry, the at least part of the first output personalization registry comprising at least part of the security parameters and the obfuscation rule, the generic replica of the mobile device software application and obfuscation software to generate a protected mobile software application that is associated with the first output personalization registry and with the at least one unique identifier, wherein the protected mobile software application is different in terms of security parameters and the obfuscation rule than another protected mobile software application obtained using at least part of the second output personalization registry, and wherein the protected mobile software application comprises the at least part of the security parameters and the obfuscation rule.

24. The system according to claim 23, where some of the security parameters of the output personalization registry are used, together with parts of the mobile device software application, to create a network of code checksums during the generation of the protected mobile software application, the code checksums being embedded into code of the mobile device software application at a time of generation of the protected mobile software application, and the code checksums being different than those of the another protected mobile software application calculated upon the second output personalization registry.

25. The system according to claim 24, where at least part of personalized security parameters and the network of code checksums are obfuscated using at least part of the obfuscation rule.

26. The system according to claim 23, where a personalized security parameter is obfuscated using a dedicated obfuscation rule.

* * * * *